Patented July 3, 1945

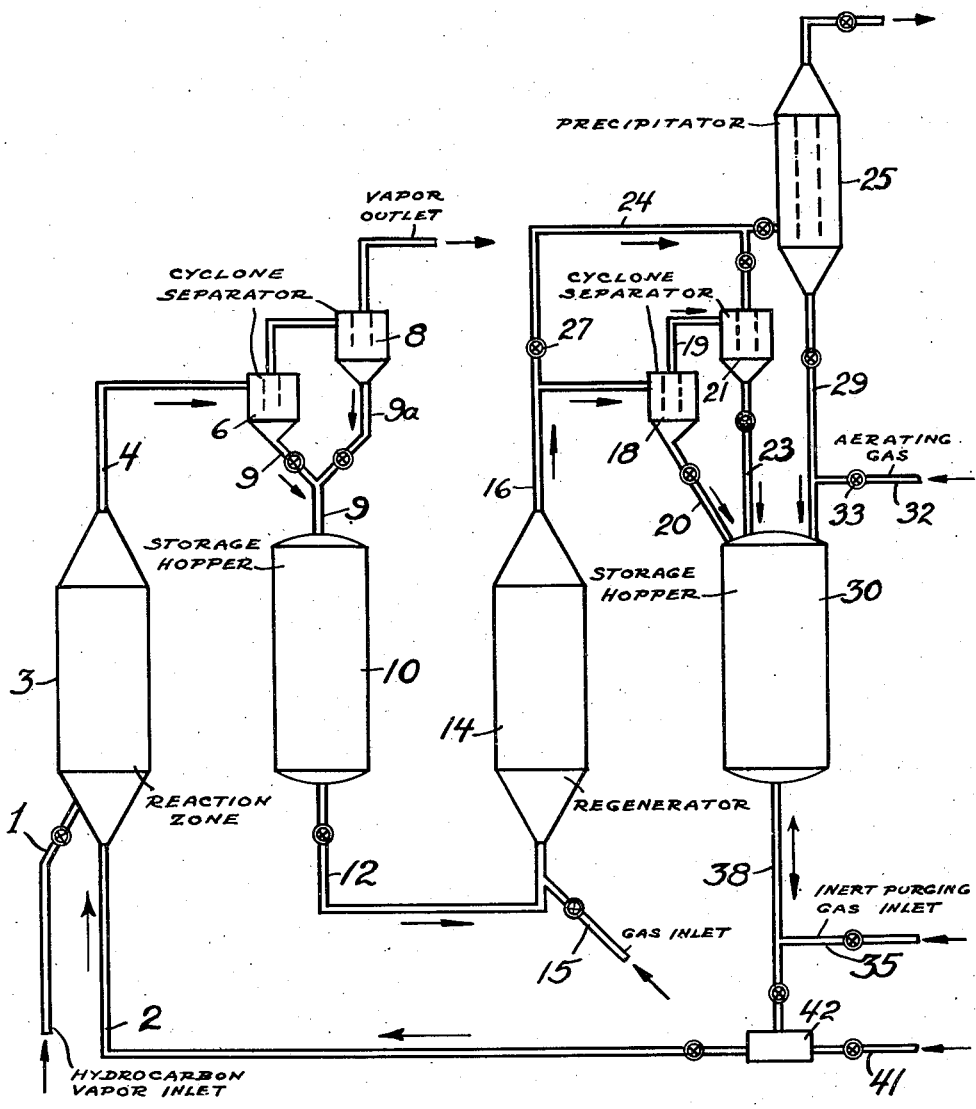

2,379,448

UNITED STATES PATENT OFFICE 2,379,448

HANDLING PULVERULENT MATERIAL

Norman F. Linn, Roselle Park, N. J., assignor to Standard Oil Development Company, a corporation of Delaware Application July 30, 1941, Serial No. 404,594

4 Claims. (Cl. 196—52)

The present invention relates to improvements in the art of treating gases and solids and, in particular, relates to improvements in the art of separating a more or less finely divided solid from a gaseous material in which it is suspended.

As is generally known, there are many instances in the industrial arts when it is necessary to separate a solid material from a gas in which it is suspended. For example, in the catalytic treatment of hydrocarbon oils in vapor phase, one recently developed method involves suspending a powdered catalyst having a particle size of from about 200–400 mesh, in vaporized hydrocarbons, forcing the suspension through a reaction zone, withdrawing the reaction products with catalyst suspended therein, and separating the solid from the reaction products. Heretofore, it has been customary to effect the separation of solid catalyst from the reaction products by forcing the suspension through a plurality of cyclone separators in series, wherein the main bulk of the catalyst is separated through cyclone separators and thereafter the fines are removed in a Cottrell precipitator.

I have found that in operating in the manner indicated substantially 90% of the solid contained in the suspension is removed in each cyclone, that is to say, when a suspension of powdered catalyst discharged into a cyclone contains 5–10 lbs. of powdered catalyst, substantially 90% of this quantity is removed in the first cyclone and substantially 90% of the remainder of the solid is removed in the second cyclone, etc. However, the gaseous material withdrawn from the second cyclone ordinarily has the bulk of the coarser material withdrawn and the powder remaining therein is usually a particle size of say 325–480 mesh, or smaller. I have found that it is uneconomical to discharge a suspension having a particle size of the order indicated into a third cyclone and, consequently, it is desirable to remove the remaining powder by discharging the suspension into a Cottrell precipitator, in a manner which will be more fully described hereinafter. I have further found that the operation of the Cottrell precipitator is more efficient if a portion of the original suspension is by-passed around both cyclones and discharged with the finer material from the second cyclone into the Cottrell precipitator.

One object of my present invention is to effect the efficient and substantially complete removal of the powdered material from a gaseous material in which it is suspended.

Another object of my invention, and the most characteristic object thereof, is to separate a solid from a gas in which it is suspended or dispersed by discharging the suspension into two cyclones operating in series, and to discharge the suspension withdrawn from the second cyclone into a Cottrell precipitator, together with a portion of the original suspension which has been by-passed around the first two cyclones.

A further object is to prevent the fines precipitated by a Cottrell from packing and clogging. One of the major difficulties noted in the operation of the electrical precipitator was that the fine material would pack in the bottom of the precipitator and in the discharge lines and hence would not flow readily from the precipitator. I have found that the inclusion of a small amount of coarser material derived from a gas stream carrying such material before being subjected to any separation, counteracts the packing tendency. Furthermore, I have found that while it is practically impossible to render the fines readily flowable as by aeration, under the usual method of operation, that when such coarser material is added this difficulty is obviated. The addition of such coarser particles enables these fines to be fluidized and to be conveyed as a fluid through conduits.

Another object of my invention is to increase the efficiency of a Cottrell precipitator employed in a system in which it operates, to separate finely divided solid material from a gas in which it is suspended by discharging into the Cottrell precipitator, together with finely divided powdered material, a coarser material derived from a gas stream carrying such material before being subjected to any separation, which coarser material increases the fluidity of the finer material and enhances its capability of freely flowing from the Cottrell precipitator.

My invention will be best understood by reference to the accompanying drawing which shows diagrammatically a combination of apparatus elements in which my invention may be performed.

Referring in detail to the drawing, hydrocarbon vapors and catalyst of a particle size range from 150–300 mesh and finer, are introduced by means of lines 1 and 2, respectively, into reaction zone 3 where the desired conversion occurs. Reacted hydrocarbon vapors are withdrawn along with spent carbonized catalyst through conduit 4 and separated by means of cyclone separators 6 and 8. The hydrocarbon vapors are passed to a recovery system (not shown) while the separated catalyst is passed by means of lines 9 and 9—a to storage hopper 10 from which it is withdrawn through line 12, thence discharged into regenerator 14 wherein it is regenerated by controlled combustion in the presence of regeneration gas admitted through line 15. The regeneration is effected at a temperature below about 1300° F., the temperature being regulated by controlling the oxygen concentration in the regenerating gas mixture. Suitable compositions are air with steam, nitrogen, flue gas or other inert gases. The regenerated catalyst and gaseous products of combustion are withdrawn from regenerator 14 through line 16 and introduced into cyclone separator 18. Substantially 90–95% of the catalyst is removed from the suspension and discharged therefrom through line 20 to storage hopper 30. The gas containing entrained catalyst not separated in separator 18 is passed through line 19 to separator 21 whereby additional quantities of powdered catalyst are removed from the gas stream and discharged to storage hopper 30 by means of line 23.

The use of two cyclone separators in series does not result in the complete removal of all suspended particles. I have found that this can be accomplished by discharging the suspension into an electrical precipitator after it has been withdrawn from the second cyclone separator and thus remove substantially all of the catalyst, including the fine particles, from the gas stream. However, much difficulty has been experienced with clogging in this latter device. The fines did not flow freely from the precipitator, but rather packed therein and would not be discharged freely. In addition, it was noted that particles of a size smaller than about 325 mesh would not become fluidized by aeration. This difficulty prevented uniform conveying of the catalyst in conduits through a system since fluid-like flow could not be obtained.

To overcome this difficulty, I have discovered that the addition of catalyst of coarser sizes to the fine particles from cyclone separator 21, prior to admission to electrical precipitator 25, is necessary. This is accomplished by withdrawing a portion of the suspension flowing in line 16 by means of line 24. The quantity withdrawn is controlled by means of a suitable valve 27. The quantity of by-passed catalyst ranging from 150 to 300 mesh and finer may vary from 10 to 70% by weight of the fines in the suspension discharged from separator 21, although is preferably between 30% and 60%.

Aerating gas, such as flue gas or air, may be introduced by line 32 in quantities controlled by valve 33 to discharge line 29 to increase the fluidity of the recovered fines, thereby assuring free flow of material in line 29 to hopper 30. Recovered and regenerated catalyst may be withdrawn from hopper 30 by means of line 38. While flowing down line 38, an inert purging gas introduced through line 35 flows countercurrently and reduces the amount of oxygen which may be absorbed on the catalyst or contained in the gaseous medium.

It will be understood that in an operation of the type herein described where tons of catalyst are separated from the cyclones daily that erosion of originally coarser particles results in progressive increase in the quantity of fines, that is to say, as the catalyst of approximately 200 mesh is continuously discharged into a reaction zone and thence separated from the reaction vapors in the cyclone separators, this original coarser material disintegrates to finer material which may have a particle size, as previously indicated, as low as 325 mesh or smaller and, as a result, the amount of material necessary to separate in vessel 25 progressively increases so that the operator may have to change the ratio of coarser material discharged through line 24 into vessel 25 in order to obtain best results.

The regenerated and purged catalyst recovered in line 38 may be mixed with an inert gaseous carrier, such as flue gas from pipe 41 in injection means 42 to form a suspension which may be then recycled through pipe 2 to reactor 3. Attention is directed to co-pending application Serial No. 402,193, filed July 12, 1941, in the name of Robert W. Krebs, which covers a method of fluidizing the fines from the Cottrell precipitator by adding thereto a small amount of coarser material.

Of course, it will be understood that the preceding description and the accompanying drawing illustrate merely one means of conveying a solid through a system and numerous other such means will occur to those skilled in this art.

What I claim is:

1. In a process for carrying out chemical reactions involving the handling of a finely divided solid consisting of a mixture of solid particles of different sizes, in which said finely divided solid is carried as a suspension in a gas or vapor and in which the greater part of said finely divided solid is separated by subjecting the suspension thereof in said gas or vapor to centrifugal action in a first separating zone, whereby the relatively coarse solid particles are separated, and then to electrical precipitation in a second separating zone, whereby the relatively fine solid particles are removed, the method of improving the flow characteristics of the relatively fine solid particles leaving said second separating zone, which comprises by-passing a portion of the suspension of finely divided solid in gas or vapor around said first separation zone, mixing said by-passed portion with the fine solid particles passing to said second separating zone, subjecting said mixture in said second separating zone to electrical precipitation, and removing a mixture of coarse and fine particles from said second separating zone in a freely flowing condition.

2. Method according to claim 1, in which the portion of the suspension of solid in gas or vapor which is not by-passed is subjected to a centrifugal separating action, the main content of finely divided solid is removed by such action, and the remaining gas or vapor carrying finely divided solid is mingled with the by-passed portion, the combined stream being then passed into said second stage for subjection to electrical precipitation.

3. Method according to claim 1, in which the mixture fed to the second separating zone contains from 30 to 60% by weight of solids from the suspension fed to the first separating zone, with respect to the weight of the relatively fine solid particles fed to the second separating zone from the first separating zone.

4. In a process for carrying out chemical reactions in the vapor phase with a powdered catalyst consisting of a mixture of solid particles of different sizes, in which said catalyst is continuously conveyed through the system as a suspension in a gas or vapor and in which the catalyst is separated by subjecting the suspension of catalyst in said gas or vapor to centrifugal action in a first separating zone whereby the relatively coarse catalyst particles are separated and then to the precipitating action of electrical discharges in a second separating zone to remove the relatively fine solid particles, the method for improving the flow characteristics of the fine catalyst particles leaving said second separating zone, which comprises by-passing a portion of the catalyst mixture being fed to the first separating zone, mixing said portion with the fine catalyst particles passing to said second separating zone, subjecting said mixture in said second separating zone to the action of elctrical discharges, and removing a mixture of coarse and fine particles from the last named zone in a freely flowing condition.

NORMAN F. LINN.